United States Patent [19]

Panas

[11] 4,233,006
[45] Nov. 11, 1980

[54] MACHINE FOR FORMING EXPANDED RESINOUS PRODUCTS

[75] Inventor: Walter Panas, Millville, N.J.
[73] Assignee: Wheaton Industries, Millville, N.J.
[21] Appl. No.: 949,958
[22] Filed: Oct. 10, 1978
[51] Int. Cl.³ .......................................... B29D 27/00
[52] U.S. Cl. ..................... 425/4 R; 264/51;
264/DIG. 10; 425/351; 425/422; 425/437;
425/441; 425/444
[58] Field of Search ........... 425/4 C, 346, 351, 436 R,
425/441, 422, 412, 4 R, 437, 444; 264/321, 51,
DIG. 10

[56] References Cited

U.S. PATENT DOCUMENTS

| | | | |
|---|---|---|---|
| 3,488,411 | 1/1970 | Goldman | 425/4 C X |
| 3,676,033 | 5/1972 | Buonaiuto | 264/321 X |
| 4,106,884 | 8/1978 | Jegelka | 425/351 X |

FOREIGN PATENT DOCUMENTS 2613768 10/1977 Fed. Rep. of Germany.

*Primary Examiner*—Philip Anderson
*Attorney, Agent, or Firm*—Miller & Prestia

[57] ABSTRACT

Apparatus for molding expandable thermoplastic resin particles having opposed mold platens. The platens having male and female mold members mounted thereon. The first platen having heated and cooled male mold members mounted thereon, and the second platen having heated and cooled female mold members mounted thereon. Tie bars extending between the first and second platens. Means for feeding expandable thermoplastic resin particles to the mold cavities defined by the male and female mold members when they are engaged together. Means for transfering the mold members from a first position wherein the heated and cooled mold members on the respective platens would be opposed to each other, and in a second position wherein the heated mold member on one platen would be opposed to the cool mold member on the other opposing platen. Means to clamp the mold members together during molding of the expandable thermoplastic resin particles.

25 Claims, 14 Drawing Figures

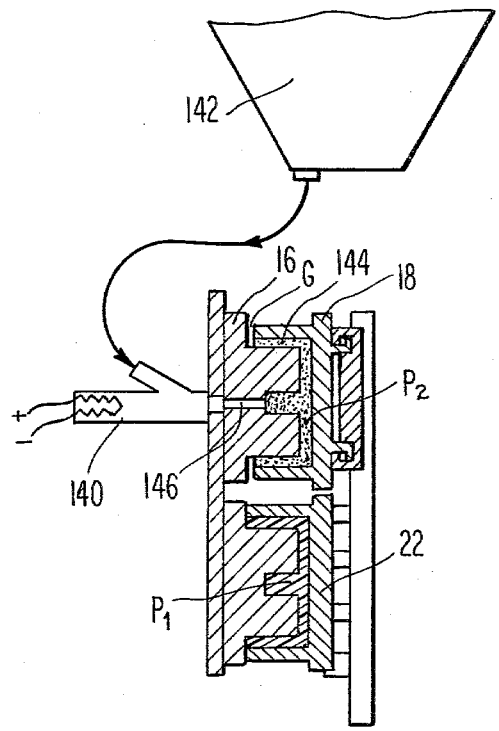
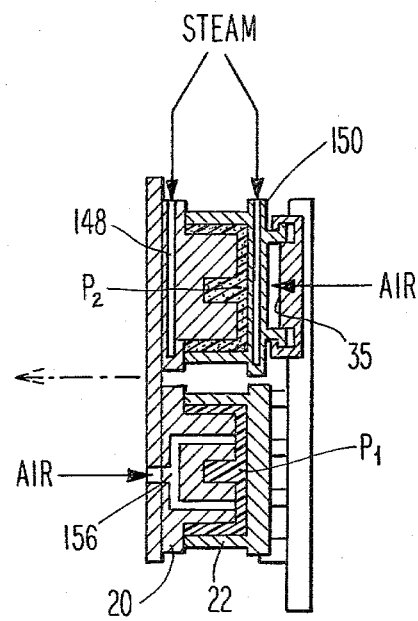
Fig. 7a        Fig. 7b
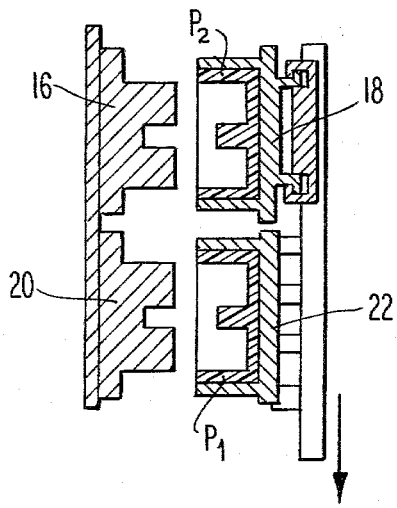
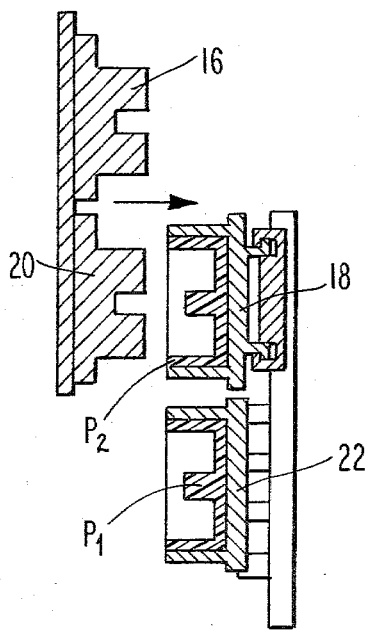
Fig. 7c        Fig. 7d

MACHINE FOR FORMING EXPANDED RESINOUS PRODUCTS

BACKGROUND OF THE INVENTION

This invention pertains to apparatus in general and a machine in particular for forming expanded resinous products, such as expanded polystyrene packing forms. More specifically, this invention pertains to such apparatus, adapted, by virtue of various interrelated design features and subassemblies, to produce expanded thermoplastic cellular products on an industrial scale in an efficient and reliable manner.

Conventional industrial equipment for making expanded resinous products, such as expanded cellular polystyrene packaging elements, generally comprise a single mold, into which partially pre-expanded resinous beads are introduced. This mold includes heating means for then heating the partially pre-expanded beads and causing an expansion thereof. Means are also provided thereafter for cooling the mold and the expanded product therein so as to interrupt the expansion step and cool the product for subsequent removal when the mold is opened. The inefficiencies in repeatedly heating and cooling such a mold are evident from, among other things, the typical cycle time in such machines. The cycle time for producing an individual molded product in each such machine is often on the order of 50 or more seconds. In addition, such machines must necessarily be relatively large and the molds relatively massive so as to withstand the repeated heating and cooling cycles while avoiding deformation and material failure.

In the literature and in some fairly recent machine developments, efforts are apparent to improve upon this conventional machine design. For example, U.S. Pat. No. 3,676,033-Buonaiuto and German Offenlegungsschrift No. 1 922 261 (believed to be equivalent to the Buonaiuto U.S. patent) disclose an apparatus wherein expanded cellular products are made in a two-step process, the partially formed and expanded product being tranferred from a first molding station to a second moding station by a frame element with the partially-formed product retained between planar members so as to confine the products during transfer. Separation of the heating and cooling steps in this operation is clearly disclosed. However, the second molding step in the Buonaiuto process involves some further forming of the expanded blank from the first mold. In addition, the molds must be open to remove the cooled, formed product from the second molding stage.

Though not published before the present invention, German Offenlegungsschrift No. 26 13 768 (published Oct. 13, 1977) discloses a two-stage apparatus for making expanded thermoplastic cellular products. This publication refers specifically to the above-referenced Buonaiuto patent and to German Pat. No. 20 11 928 discussed below.

Offenlegungsschrift No. 26 13 768 differs from Buonaiuto primarily in that it utilizes a second stage mold element, more specifically a non-heated, non-cooled second stage male mold as the transfer element. Thus, a performed expanded cellular blank is retained in a half of the heated first stage mold when the molds are open and the second stage mold transfer element is transferred up and into engagement with the open first stage mold, where it picks up the preform and then is moved back to be inserted into the second stage mold upon mold closure. Simultaneous forming of the preform in the heated first stage and end forming in the cooled second stage of the apparatus is specifically disclosed. Product removal from the open second stage mold occurs simultaneously with the transfer of the second stage mold transfer element to pick up the previously formed preform from the first stage mold. German Pat. No. 20 11 928 -Brandenburger also discloses a two stage apparatus for making plastic products. It, however, does not suggest application of this apparatus to making expanded thermoplastic cellular forms. It does, however, disclose the formation of a preform in the first stage of the apparatus and the reuse of a preform mold element as a transfer element by which the perform is moved into engagement with a second stage or end-forming mold. Draw forming of the preform in the end mold stage is accomplished by the application of vacuum on one side and air pressure on the other side to transform the preform from the preform mold transfer element into the shape of the end form mold. No comparable mating (male) mold half in the forming mold is used in this process.

The use of a mold element as a transfer member to subsequent molding stages is also seen in U.S. Pat. Nos. 3,129,464—Heider, 3,193,874—Jablonski, 3,342,913—Engel and 3,374,500—Drenning. Each of these patents pertain to the molding of foamed or cellular thermoplastic articles.

The use of mold elements as transfer members is also well known in other fields as shown, for example, by U.S. Pat. Nos. 3,054,141—Hammesfahr (rubber tire vulcanization), 3,407,433—Beebee et al (injection molding), 1,336,579—Oxley (salt block forming), and 2,003,702—Straub (concrete block making).

It should be noted that in each of the foregoing references, a forming or molding operation occurs in the stage after transfer. Thus the second stage mold or forming element in each case, where two stage molding is disclosed, involves a mold or shape of different configuration than in the article formed prior to transfer. Thus the article prior to transfer is better characterized in these disclosures as preforms. Of these, only Buonaiuto and Jegelka (Offenlegungsschrift No. 26 13 768) refer to the energy savings involved in the first stage heating and the second stage cooling of an expanded thermoplastic bead product.

To the extent the foregoing references in the expanded thermoplastic bead product field consistently indicate some forming or pressing operation in the second stage mold, it is apparent that the processes and apparatus disclosed would not be applicable for forming expanded thermoplastic cellular products of thicker cross-sections. It is in the forming of such products that significant problems and delay times are incurred to provide relative uniformity in cellular expansion and densification of the final product. To that end, various other teachings have been directed. For example, German Offenlegungsschrift No. 2 003 657 pertains to a procedure involving partial mold opening in conjunction with low pressure steam and subsequent re-closing of the mold to effect better expansion of the product into all mold corners and reducing the subsequent cooling time required. Similarly, British Pat. No. 923,189 discloses a procedure involving pressurized steam to permit more complete expansion of the product and British Pat. No. 945,073 discloses a staged heating process to effect uniformity in the expanded cellular article. The overall necessity of uniformly heating the expanded thermoplastic beads in these processes for forming thicker cross-section products necessarily involves relatively long delay times both in heating and in the subsequent cooling phase. Typically, such products are cooled either by very long delay times or by actual cooling of the mold or by spraying of the molded articles with cooling water or by combinations of these processes.

Applicants are aware that prior to their invention, others had developed a prototype machine for making expanded thermoplastic cellular products wherein a heated mold element was used as a transfer member and a separate second stage cooled mold, of essentially the same configuration as the first stage mold, was provided to permit cool down of the product simultaneous with the formation of a successive product, all for the purpose of reducing machine cycle time and energy consumption by the separation of the heating and cooling phases of the molding operation. In this machine, however, no provision was included for heating the hot mold transfer element. In addition, the hot mold transfer element operated effectively independently of the corresponding cold mold element which had to be withdrawn, also independently, to permit transfer of the hot mold element into the mating cold mold.

Having these various teachings in mind, it is the general objective of the present invention to provide more efficient apparatus capable of producing expanded thermoplastic cellular product, such as expanded polystyrene packaging elements of relatively thick cross-sections.

More specifically, it is the object of this invention to provide a machine inherently capable by its design of repeatedly producing expanded thermoplastic cellular product of high quality at high production rates and relatively low energy consumption.

BRIEF DESCRIPTION OF THE INVENTION

Briefly, these objectives are met, in accordance with the present invention, by an apparatus for making expandable cellular resin products having opposed mold platens, each platen including a pair of either male or female molds of essentially similar configuration, one of the molds on each platen being heated and one being cooled and the molds on one of the platens also including a transfer means by which, with the platens open, the molds could be transferred from a first position at which the heated and cooled molds on the respective platens would be opposed to one another to a second position wherein the heated mold on one platen would be opposed to the cooled mold on the opposing platen. Means are also included for introducing a heat expandable cellular resin (preferably partially pre-expanded polystyrene beads) into the heated male and feamale mold members upon their engagement. Preferably also, the heated male and female molds remain slightly spaced from one another upon platen closure with one of the molds including further closure means to effect clamping of the molds together simultaneous with or just after the expandable bead raw material has been introduced into the hot molds.

It is further preferred that there also be included means for ejecting a cooled molded product from the non-engaged cool mold during mold transfer and also ejection means for positively transferring the hot molded intermediate product from the hot mold transfer element to the mating cold mold.

Various other features and aspects of the present invention will be apparent from the detailed description thereof which follows. For a better understanding of the present invention, including particularly the preferred embodiment illustrated and described, reference may be made to the following detailed description thereof, taken in conjunction with the appended claims and the drawings.

DESCRIPTION OF DRAWINGS AND DETAILED DESCRIPTION OF THE INVENTION, INCLUDING THE PREFERRED EMBODIMENT ILLUSTRATED

In the drawings:

FIGS. 7a to 7h are sequential views, showing a cross-sectional elevation of the mold area of the apparatus shown in FIGS. 1 to 6, and depicting the mold positions in various stages of the operational cycle of the apparatus.

Figure 1:
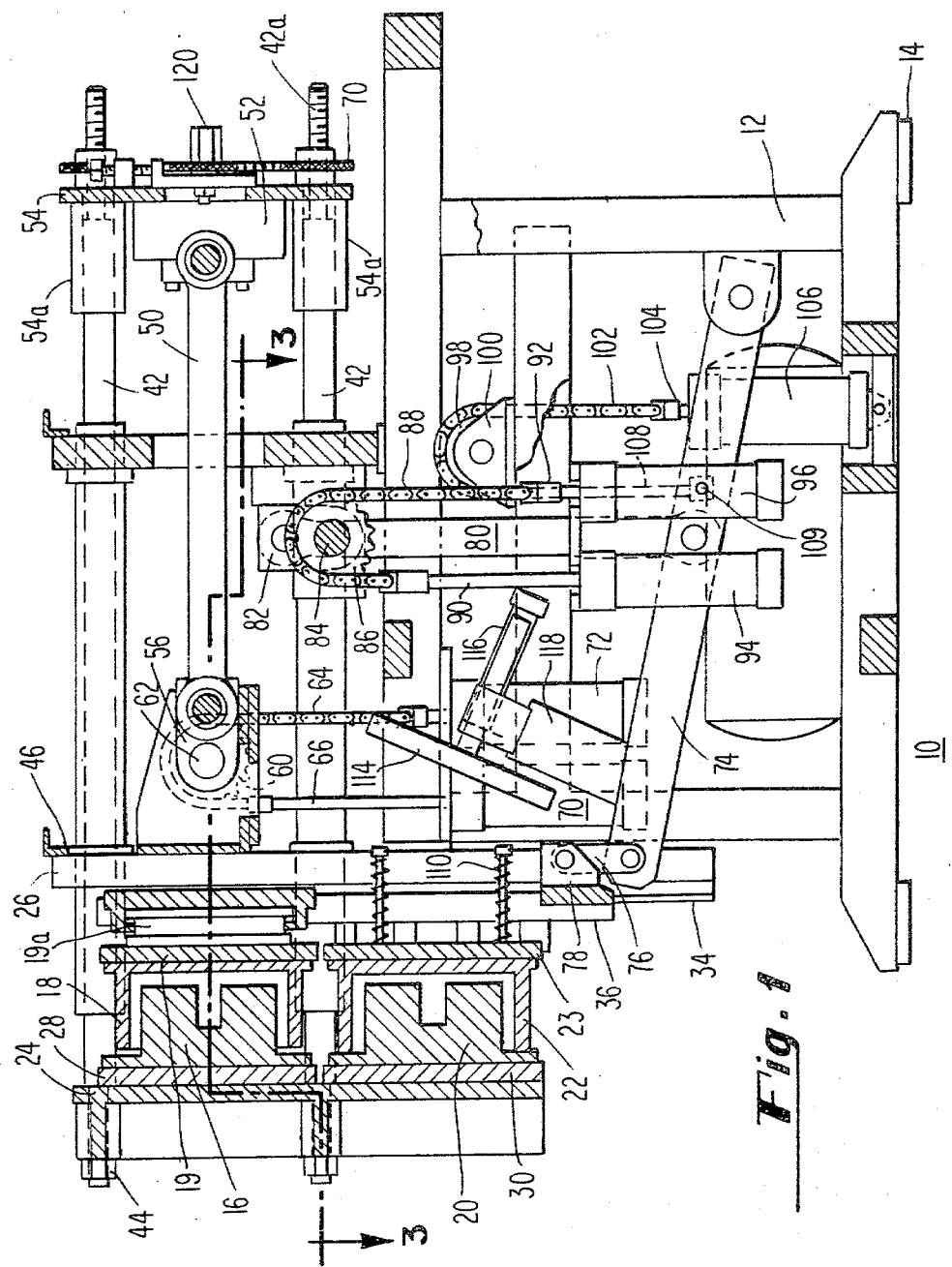
FIG. 1 is a side elevation view, partially in section, of the apparatus for forming expanded resinous products of the present invention, with the apparatus in its first mold transfer limit position.
Figure 2:
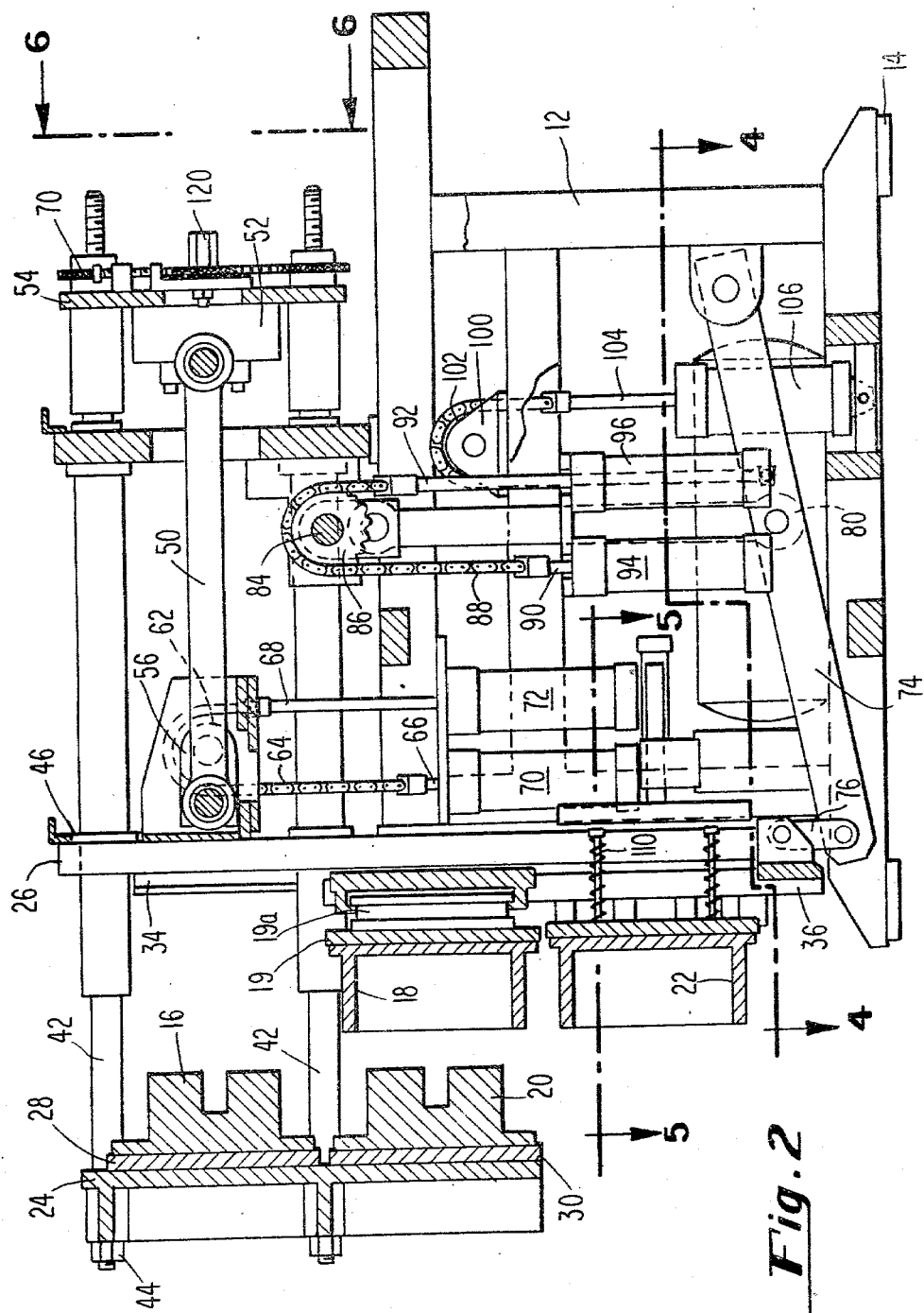
FIG. 2 is a side elevation view, partially in section, of the apparatus shown in FIG. 1, but in its second mold transfer limit position.
Figure 3:
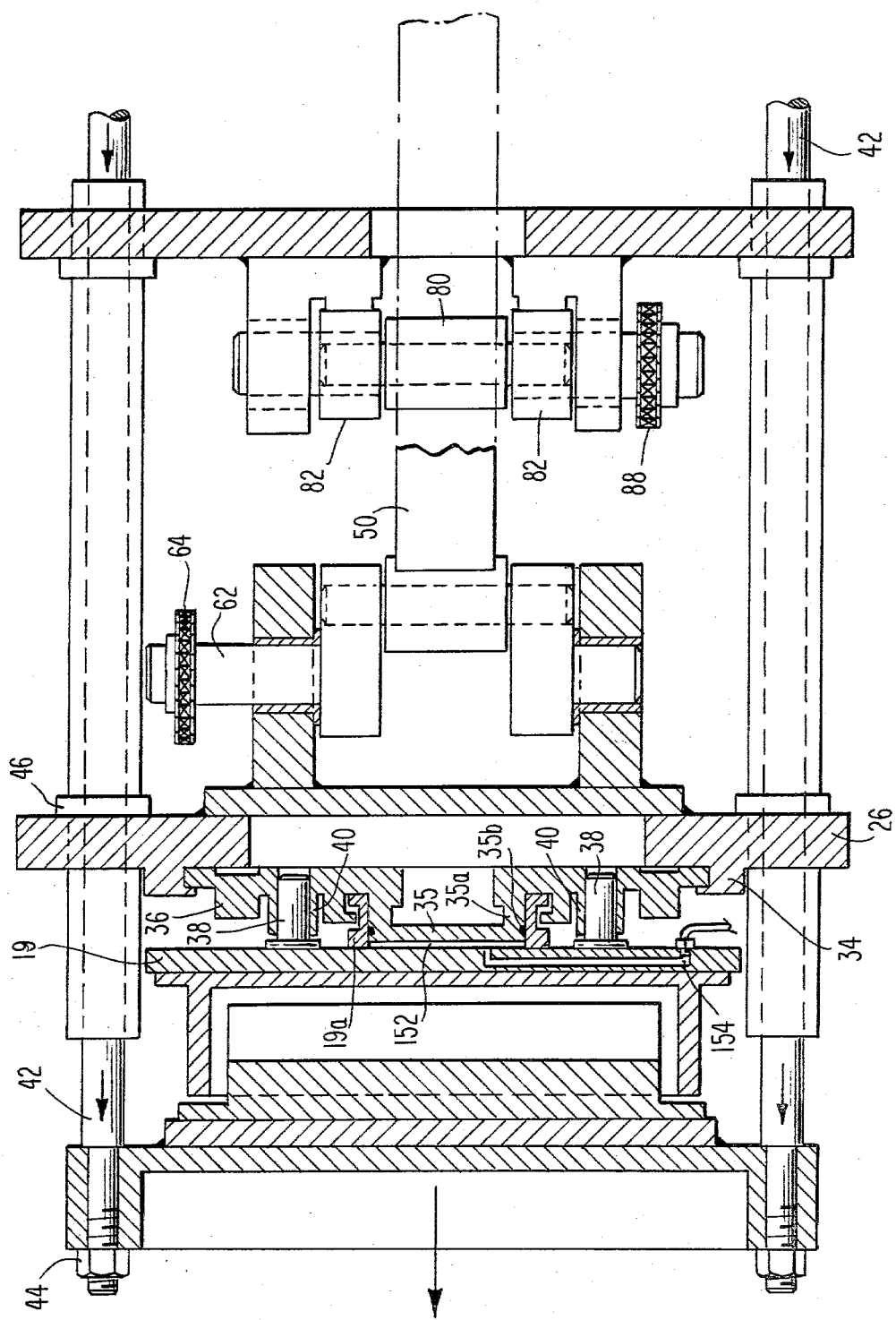
FIG. 3 is a horizontal cross-section view of the apparatus of FIGS. 1 and 2, taken along line 3—3 of FIG. 1.
Figure 4:
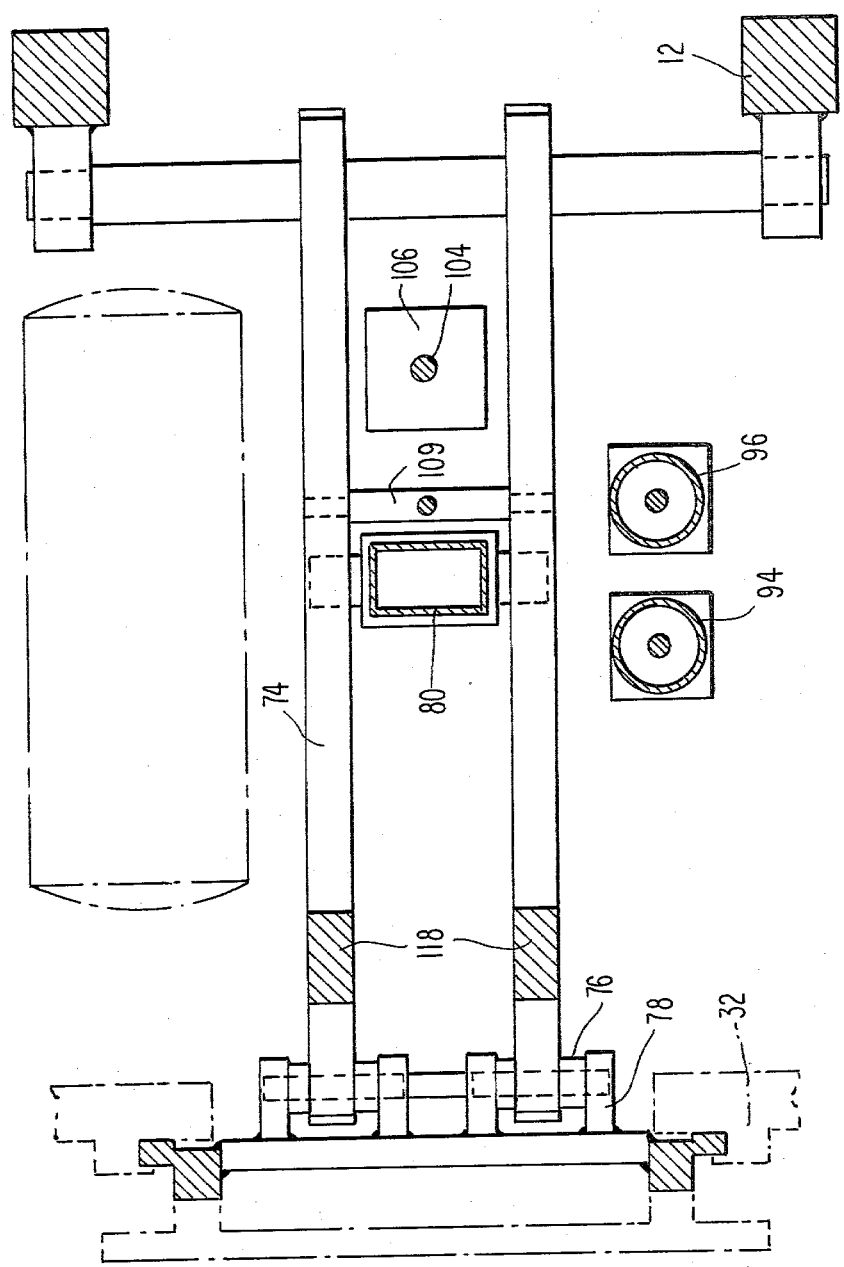
FIG. 4 is a horizontal cross-section view of the apparatus shown in FIGS. 1-3, taken along the line 4—4 of FIG. 2.

Referring to FIGS. 1, 2, and 3 apparatus 10 includes a static frame 12, to which all of subsequently disclosed subassemblies are attached, and a plurality of floor pads 14.

Heated male mold 16 and cooled male mold 20 are mounted on movable first platen 24 by intermediate mounting plates 28 and 30. Heated female mold 18 and cooled female mold 22 are mounted on fixed second platen 26 which includes vertically disposed channel guides 34, and a female mold mounting plate 36 slidable along channel guides 34. Cooled female mold 22 is attached to female mold mounting plate 36 through a second mounting plate 23. While heated female mold 18 is mounted through still another mounting plate 19, to a fluid activated clamping piston 35. Guide rods 38, horizontally movable in guide rods receivers 40 associated with female mold mounting plate 36, together with piston side walls 35a, cylinder side walls 19a and piston seal ring 35b form a heated mold final closure piston assembly, to which is provided a piston activating fluid, namely air, through channel 154.

A plurality of tie bars 42, threaded at their rearward ends, extend between the first and second platens 24 and 26. Tie bars 42 are attached at their forward ends to movable first platen 24 by means of fastening bolts 44 and extend through bushings 46 in second platen 26.

Parallel tie bars 42 are attached to first platen 24 for coordinated movement therewith in a direction (longitudinal) along the length of tie bars 42.

Longitudinal movement of tie bars 42 moves first platen 24 toward or away from second platen 26. Consequently, facing male and female molds are moved from a mold open limit position to a mold closed limit position, shown also in FIG. 7a and 7b.

For mold opening and closing movement horizontally disposed push arm 50 is pivotally mounted at one end to a bracket member 52 which is itself affixed to a rear tie rod attachment plate 54. The opposite or forward end of horizontally disposed push arm 50 is pivotally mounted to a mold opening crank member 56, the opposite end of which is mounted on a shaft 62 for which common rotational motion with driven sprocket wheel 60. Thus, rotational motion of the driven sprocket wheel 60 translates into horizontal motion of the tie rods 42 through crank member 56 and horizontally disposed push arm 50.

Driven sprocket wheel 60 engages a drive sprocket chain 64 which is attached at its ends to piston rods 66 and 68, in turn associated with fluid actuation cylinders 70 and 72, the coordinated activation of which provides rotational movement of driven sprocket wheel 60.

For vertical movement of the female molds 18 and 22 from a first mold transfer limit position, in which the mating heated and mating cooled male and female molds face one another, to a second mold transfer limit position, in which the heated female mold on the second platen 26 is moved into a position facing the cooled male mold on the first platen 24, female mold mounting plate 36 is pivotally attached through bracket 78 to a pair of lift arms 74 each of which is pivotally attached at its opposite end to static frame 12. At a point intermediate its ends, each of lift arms 74 is attached to cross members 75, which is in turn pivotally attached to the lower end of vertically disposed elevation link 80. At its upper end, elevation line 80 is pivotally attached to mold transfer crank 82 which is fixed at its opposite end to shaft 84, and which is also fixed to driven sprocket wheel 86. Rotational movement of driven sprocket wheel 86 translates into a raising and lowering movement of lift arms 74 through the movement of mold transfer crank 82 and elevation link 80. Drive sprocket chain 88, engaging sprocket wheel 86, is attached at its ends to fluid actuation piston rods 90, 92, associated with actuation cyclinders 94 and 96 respectively

1. In the preferred form of this, invention, multiple side by side sprocket wheels and chains (with connecting yokes at their ends) operate in parallel to affect the movement here described for clarity, with reference to a single set of such elements, in both the mold opening and mold transfer mechanism.

Counter balance means, provided to limit the shock upon the downward travel of lift arms 74 to the second mold transfer limit position, comprise sprocket wheel 98 mounted to a bracket 100 on frame 12. Sprocket drive chain 102 engages sprocket wheel 98 and is attached at one end to piston rod 104 of a counter balance cylinder 106 and at the other end to line 108 which is pivotally mounted at its opposite end to a connecting bar 109, transversely affixed between lift arms 74.

Figure 5:
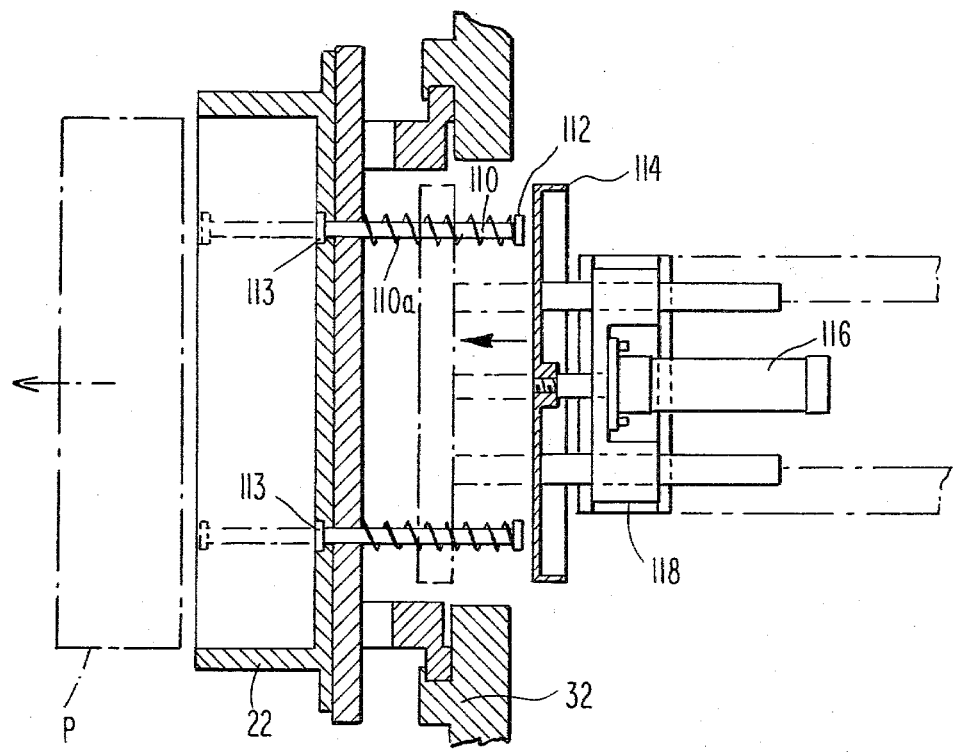
FIG. 5 is an expanded detail, horizontal cross-section view of the apparatus, as shown in FIGS. 1-4, taken along the line 5—5 of FIG. 2.

As seen best in FIGS. 1 and 5, when the cooled female mold 22 is moved to the second mold transfer limit position, ejection means are provided to remove the resin product, P, from mold 22. The ejection means, includes push rods 110 biased rearwardly by springs 110a having stops 112 at their rear ends and pusher faces 113 at their front ends, pusher faces 113 resting flush with the inner surface of female mold 22 in the normally biased position of rods 110. Push rods 110 are slidable through the base of the cooled female mold 22 and, upon activation, are pushed forward in an ejection position by contact with a pusher plate 114, actuated by a fluid actuated piston 116. Pusher plate 114 is attached to lift arms 74 through bracket 118, for coordinated movement therewith, bracket 118 being angled slightly so that when lift arms 74 are in their downwardmost position, i.e., the second mold transfer limit position, pusher plate 114 is aligned with push rods 110. Then, pusher plate 114 being in square alignment with push rods 110, fluid piston 116 is simultaneously actuated.

Figure 6:
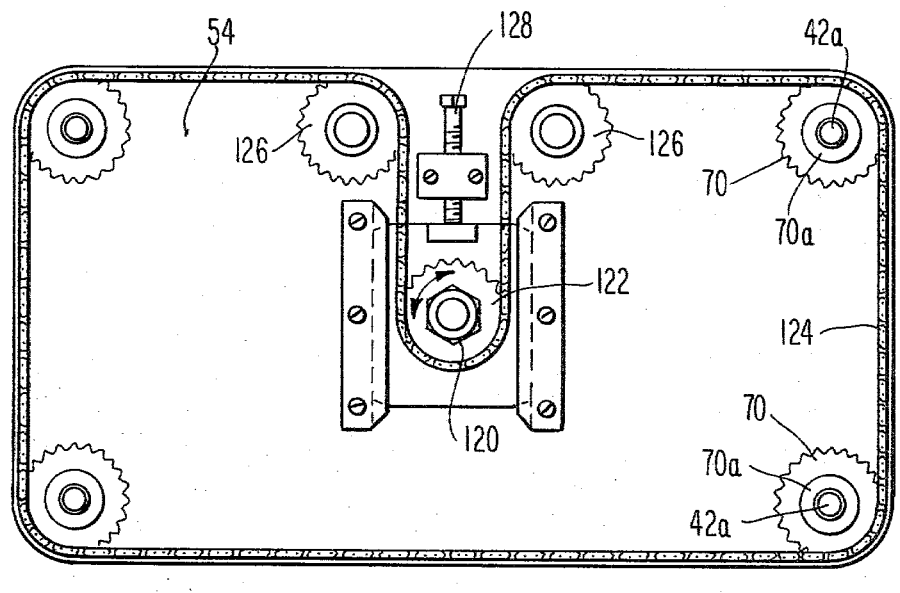
FIG. 6 is an expanded rear view of one part of the apparatus shown in FIGS. 1-5, taken along the line 6—6 of FIG. 2.

In FIG. 6, is seen a means for adjustment of distance between first and second platens 24 and 26 in the mold open position. For this purpose a horizontal tie rod travel adjustment nut 120 is affixed to a sprocket wheel 122 at the rear side of rear tie bar attachment plate 54.

Tie rods 42 are affixed to plate member 54 by retainer sleeves 54a and internally threaded adjustment wheels 70a affixed to sprocket wheels 70 and in which are engaged the threaded rear ends 42a of tie rods 42. For coordinated adjustment of all of the tie rods to the same length, sprocket wheels 70 are rotated in unison by sprocket chain 124, driven by sprocket wheel 122 associated with adjustment nut 120. Idler sprockets 126 are included to assure equal engagement of chain 124 with all of the sprocket wheels 70. To assure retention of adjustment nut 120 at the adjusted position adjustment locking bolt 128 is provided.

Referring to FIGS. 7a through 7h there is illustrated diagrammatically, the sequential movement of the various molds and mold transfer elements 22 during an operational cycle of the machine.

In FIG. 7a, heated mating male and female and cooled mating male and female molds face one another with the platens in the mold closed position and the vertical mold transfer in its upper or first limit position. At this stage a product $P_1$, formed in the previous cycle of the machine, is cooled in the mating cooled molds. At the same time, partially pre-expandable resin (such as polytyrene) beads from reservoir 142 are introduced into molding space 144 formed by heated molds 16 and 18. Through mold feed port 146 by pressurized air passing throat 140, in which it is warmed by a resistive heater.

This is the first stage in forming a new product $P_2$. At this stage, a slight gap G remains at the edges of the heated molds to permit gas and air to escape rapidly therefrom.

While molds 20 and 22 are cooled through internal chambers, not shown, molds 16 and 18 are heated by the introduction of steam through channels 148 and 150 respectively, illustrated in FIG. 7b. At the same time gas (namely air) under pressure is introduced through channel 154 between female heated mold mounting plate 19 and female mold mounting plate 36. The pressure created by this gas in space 152 moves the female mold 18 along guide rods 38, clamping the heated molds into a fully closed position, eliminating gap G and bringing into contact the edges of molds 16 and 18.

Also at the same time, pressurized air introduced through channel 156 in the cooled male mold 20 effects a transfer molded product $P_1$ for retention in female mold 22.

After the resin beads have fully expanded to form resin product $P_2$ in molds 16 and 18, and product, $P_1$ in molds 20 and 22 has sufficiently cooled, the movable platen 24 is actuated and the molds are moved into the mold open position by actuation of the horizontally disposed push member 50 and its associated elements (as described earlier with reference to previous figures). This stage is shown in FIG. 7c. Molded product $P_2$, still warm and expanding, tends to remain in the cavity of female mold 18, for subsequent transfer.

Next, the molds are moved to the lower or second mold transfer limit position by actuation of lift arms 74 and their associated elements (as described earlier with reference to previous figures). This stage is shown in FIG. 7d.

Figure 7E:
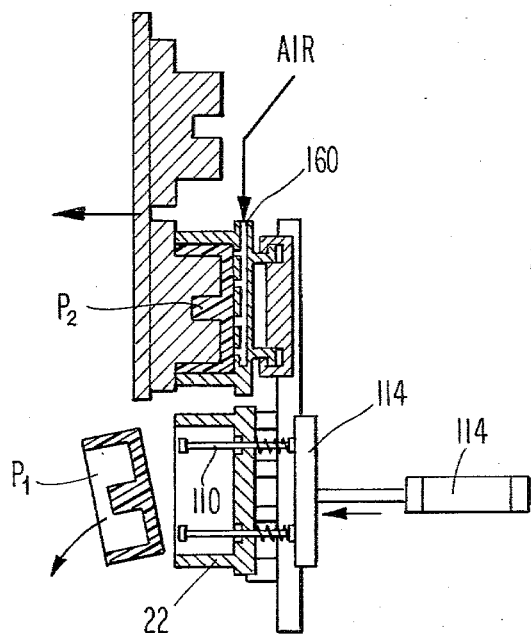
Figure 7F:
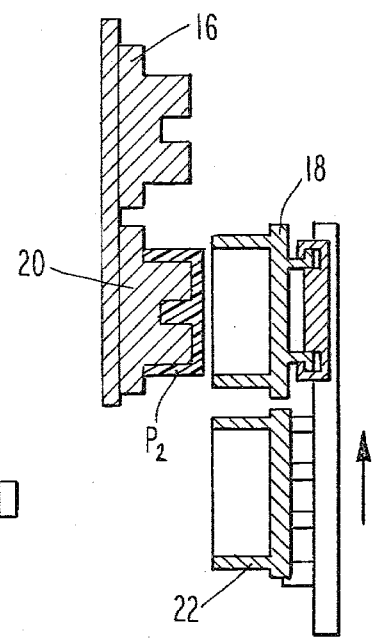

The molds are then closed as shown in FIG. 7e, and, push-plate 114, brought up by its connection to lift arms 74 (discussed with reference to earlier figures) and further actuated by cylinder 116 engages push rods 110 thereby displacing molded product "P₁" from the cooled female mold 22. Simultaneously, heated female mold 18 is mated with cooled male mold 20 and air is introduced into channel 160 in heated female mold 18, so that upon disengagement with cooled male mold 20, resinous product "P₂" is retained on male mold 20, as shown in FIG. 7f.

Figure 7G:
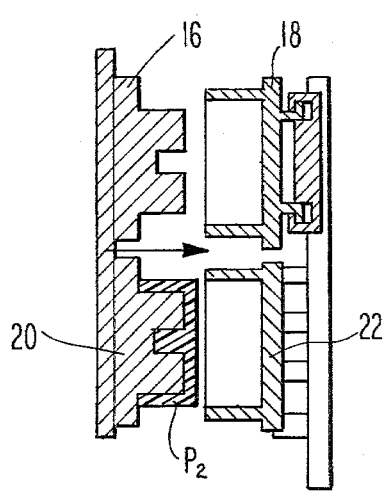
Figure 7H:
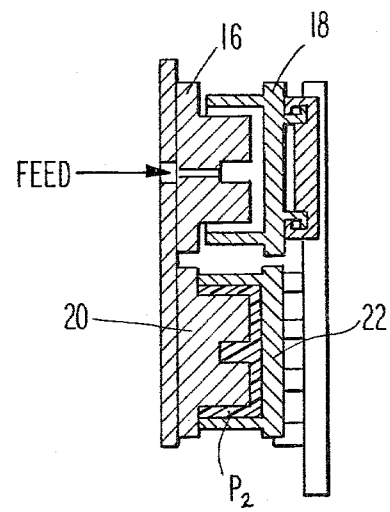

Lift arms 74 are then actuated in an upward direction to the first mold transfer limit position as shown in FIG. 7g and horizontally disposed member 50 is actuaged to close the molds again, as shown in FIG. 7h, in readiness for the heated molds 16 and 18 to receive pre-expanded resinous beads. The sequence, as described with reference to FIGS. 7a through 7h, is then repeated.

While this invention has been described with respect to a specific embodiment, it is not limited thereto. The appended claims therefore are intended to be construed to encompass all forms and embodiments of the invention, within its true spirit and full scope, whether or not such forms and embodiments are suggested herein.

Based upon the foregoing description of this invention, the following is claimed:

1. Apparatus for molding heat expandable cellular resin products comprising mating heated male and female molds and mating cooled male and female molds, said heated and said cooled male molds positioned on a first platen and said heated and said cooled female members positioned on a second platen, said platens including means for moving at least one of said platens toward and away from the other of said platens and thereby for opening and closing said mating molds, one of said platens further including mold transfer means for moving said heated mold mounted thereon from a first mold transfer limit position, in which said mating heated and mating cooled male and female molds face one another, to a second mold transfer limit position, in which said heated mold on said platen with mold transfer means is moved into a position facing said cooled mold on the opposite platen, the edges of said heated molds in said first mold transfer position remain slightly spaced from one another when said platens are in said mold closed position, one of said platens including movable heated mold mounting means adapted to be moved relative to said platen in the platen mold closure direction, after said platens are in the platen mold closed position, whereby the edges of said heated molds are brought into contact with one another, the cooled mold on said platen with mold transfer means including ejection means adapted to eject a cooled product retained thereon, said apparatus further including means for introducing heat expandable cellular resin into said heated male and female molds, upon engagement thereof.

2. Apparatus, as recited in claim 1, including means for ejecting a molded product from said heated mold on said platen with mold transfer means to effect transfer thereof to said cooled mold mated therewith in said second mold transfer limit position.

3. Apparatus, as recited in claim 1 or 2, wherein said platens include tie bars extending therebetween, said tie bars being attached to one of said platens for coordinated movement therewith in a direction along the length of said tie bars, the other of said platens being fixed relative to said tie bars.

4. Apparatus, as recited in claim 3, wherein said fixed platen includes said mold transfer means and said cooled mold on said fixed platen is open in said second mold transfer limit position for ejection of product therefrom.

5. Apparatus, as recited in claim 4, wherein the molds engaged at said second mold transfer limit position include a heated female mold with means for ejecting a molded product therefrom and transfering same to said male engaged therewith.

6. Apparatus, as recited in claim 1, wherein said movable heated mold mounting means includes guide rods slidably mounted in guide rod receivers and a fluid actuable clamping piston for actuation of said movable heated mold mounting means.

7. Apparatus, as recited in claim 6, wherein said resin introducing means is synchronized for substantially simultaneous operation with said movable heated mold mounting clamping piston, whereby gas is permitted to escape at the edges of said mating heated molds as the molds are filled and prior to closure thereof by said clamping piston.

8. Apparatus, as recited in claim 4, wherein said fixed platen mold mounting base includes channel guide means associated with said fixed platen and sliding means associated with said molds and adapted to be retained in and slide along said channel means between said two mold transfer limit positions.

9. Apparatus, as recited in claims 4 or 5, wherein said fixed platen cooled mold includes product ejection means actuable at said second mold transfer limit position.

10. Apparatus, as recited in claim 9, wherein said product ejection means includes push rods adapted to be pushed through said fixed platen cooled mold, toward an open face thereof.

11. Apparatus, as recited in claim 10, wherein said push rods are engaged and pushed by a pusher plate actuated by a fluid actuated piston.

12. Apparatus, as recited in claims 10 or 11, wherein said push rods are engaged by a pusher plate attached to a member of said mold transfer means, whereby actuation of said mold transfer means simultaneously moves said pusher plate into engagement with said push rods.

13. Apparatus, as recited in claim 8, wherein said sliding means and said channel guide means are adapted to provide vertical mold transfer movement, further including means for actuating said sliding means, said sliding actuation means comprising lift arms, pivotally attached to one end thereof to said sliding means, and pivotally attached, at a point on said lift arms spaced therefrom, to a static frame member of said apparatus, with elevation means intermediate said pivotal attachment points to raise and lower said lift arms.

14. Apparatus, as recited in claim 13, wherein said elevation means comprises a vertically disposed connecting link pivotally attached at one end to said lift arms and at the other end to a mold transfer crank.

15. Apparatus, as recited in claim 14, wherein said mold transfer crank is mounted for rotation with a driven sprocket wheel engaged by a drive sprocket chain attached at its ends to fluid actuated pistons.

16. Apparatus, as recited in claims 13, 14 or 15, wherein said lift arms are attached to a pusher plate adapted to engage product ejection means associated with said fixed platen cooled mold upon upward actuation of said lift arms.

17. Apparatus, as recited in any of claims 13, or 14, or 15, further including counter balance means adapted to limit the shock upon downward travel of said mold transfer means and members associated therewith to said second mold transfer limit position.

18. Apparatus for molding heat expandable cellular resin products comprising mating heated male and female molds and mating cooled male and female molds, said heated and said cooled male molds positioned on a first platen and said heated and said cooled female members positioned on a second platen, one of said platens is movable and the other of said platens is fixed, platen actuation means adapted upon actuation thereof to move said movable platen from a mold open limit position to a mold closed limit position in which facing male and female molds on said platens engaged one another, said platen actuation means consisting of a plurality of parallel tie rods attached to said movable platen and extending through bushings therefore attached to said fixed platen, and means for reciprocably driving said tie rods, whereby said movable platen is driven between said mold opened and mold closed position, one of said platens further including mold transfer means for moving said heated mold mounted thereon from a first mold transfer limit position, in which said mating heated and mating cooled male and female molds face one another, to a second mold transfer limit position, in which said heated mold on said platen with mold transfer means is moved into a position facing said cooled mold on the opposite platen, the cooled mold on said platen with mold transfer means including ejection means adapted to eject a cooled product retained thereon, said apparatus further including means for introducing heat expandable cellular resin into said heated male and female molds, upon engagment thereof.

19. Apparatus, as recited in claim 18, wherein said tie rod reciprocal driving means comprises a plate member to which said tie rods are attached and mold opening means for reciprocably moving said plate in a direction parallel to said tie rods.

20. Apparatus, as recited in claim 19, wherein said tie rods are horizontal and said mold opening means comprises a pivotally attached horizontally disposed member horizontally actuated by a mold opening crank member.

21. Apparatus, as recited in claim 20, wherein said mold opening crank member is engaged for rotation with a driven sprocket wheel, a driving sprocket chain engaged therewith and fluid actuation pistons attached to the ends of said chain.

22. Apparatus, as recited in claims 19, 20 or 21, including adjustment means for controlling the distance between said platens in said mold open position, said adjustment means comprising means for adjusting the lengths of said tie rods between said plate member and said movable platen.

23. Apparatus, as recited in claim 22, wherein said tie rod length adjustment means comprises threaded engagement of said tie rods in said plate member.

24. Apparatus, as recited in claim 23, further including means for rotating said tie rods, about the individual axes thereof, in unison.

25. Apparatus, as recited in claim 24, wherein said rotating means comprises a sprocket wheel attached to each tie rod and a sprocket chain engaged therewith and adapted to be driven and thereby to turn said sprocket wheels and said threadedly engaged tie rods in unison.

* * * * *